(12) United States Patent
Peng et al.

(10) Patent No.: US 9,412,419 B2
(45) Date of Patent: Aug. 9, 2016

(54) HARD DISK DRIVE MODULE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Wen-Tang Peng, New Taipei (TW); Hai-Chen Zhou, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 69 days.

(21) Appl. No.: 14/471,935

(22) Filed: Aug. 28, 2014

(65) Prior Publication Data

US 2015/0092338 A1   Apr. 2, 2015

(30) Foreign Application Priority Data

Sep. 29, 2013   (CN) .......................... 2013 1 0450158

(51) Int. Cl.
*G06F 1/16*   (2006.01)
*G11B 33/12*   (2006.01)

(52) U.S. Cl.
CPC ............ *G11B 33/128* (2013.01); *G11B 33/124* (2013.01)

(58) Field of Classification Search
CPC ...................................... H05K 7/023
USPC ...................................... 361/679.33
See application file for complete search history.

(56) References Cited

U.S. PATENT DOCUMENTS

| | | | | |
|---|---|---|---|---|
| 4,501,460 A * | 2/1985 | Sisler | ...................... | G06F 1/181 361/679.58 |
| 5,067,040 A * | 11/1991 | Fallik | ...................... | G06F 1/20 361/679.48 |
| 5,515,239 A * | 5/1996 | Kamerman | .......... | H05K 7/1441 206/509 |
| 5,602,721 A * | 2/1997 | Slade | ...................... | G06F 1/18 206/504 |
| 5,864,467 A * | 1/1999 | Recchia | ................ | H05K 5/0021 174/561 |
| 6,059,614 A * | 5/2000 | Shelby | ................. | G06F 13/4095 361/735 |
| 6,137,686 A * | 10/2000 | Saye | ....................... | G06F 1/1626 361/679.43 |
| 6,315,582 B1 * | 11/2001 | Nishio | ................ | H01R 13/2442 439/131 |
| 6,359,218 B1 * | 3/2002 | Koch | .................... | H05K 5/0021 174/50 |
| 6,377,446 B1 * | 4/2002 | Liau | ...................... | G11B 33/022 312/223.2 |
| 6,698,851 B1 * | 3/2004 | Ludl | .................... | H05K 5/0021 312/108 |
| 7,116,553 B2 * | 10/2006 | Bleau | .................... | H04N 5/2251 361/679.48 |
| 7,245,497 B2 * | 7/2007 | Klein | ...................... | H05K 7/142 361/752 |
| 7,529,096 B2 * | 5/2009 | Lin | ........................ | G06F 1/18 312/223.2 |
| 7,602,603 B2 * | 10/2009 | Cheng | .................... | G06F 1/181 312/223.2 |
| 7,656,671 B2 * | 2/2010 | Liu | ......................... | G06F 1/185 361/735 |
| 7,815,264 B2 * | 10/2010 | Lin | ........................ | G06F 1/181 312/108 |
| 8,665,599 B2 * | 3/2014 | Shen | .................... | H02J 7/0045 361/301.4 |
| 9,089,058 B2 * | 7/2015 | Liang | .................... | H05K 7/023 |
| 2006/0181845 A1 * | 8/2006 | Shah | ...................... | G11B 33/12 361/679.4 |
| 2009/0141458 A1 * | 6/2009 | Liu | ......................... | G06F 1/185 361/728 |
| 2010/0020484 A1 * | 1/2010 | Chang | .................. | G11B 33/127 361/679.33 |
| 2010/0097750 A1 * | 4/2010 | Souda | .................. | G06F 1/1624 361/679.33 |
| 2013/0279121 A1 * | 10/2013 | Lin | .......................... | H05K 7/06 361/737 |

* cited by examiner

*Primary Examiner* — Anthony Q Edwards
(74) *Attorney, Agent, or Firm* — ScienBiziP, P.C.

(57) ABSTRACT

A hard disk drive (HDD) module includes two cartridges for receiving two HDDs. Each cartridge includes a bottom tray and a top cover adjustably connected to the bottom tray. Each top cover includes a top plate located above the corresponding bottom tray. The cartridges are arranged up and down. The bottom tray of the upper cartridge is fastened to the top cover of the lower cartridge.

14 Claims, 5 Drawing Sheets

HARD DISK DRIVE MODULE

FIELD

The present disclosure relates to a hard disk drive module.

BACKGROUND

A plurality of hard disk drives (HDDs) is configured in a server. A plurality of cartridges in the server is arranged up and down, for receiving the HDDs. Different servers may have different sizes.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

Figure 1:
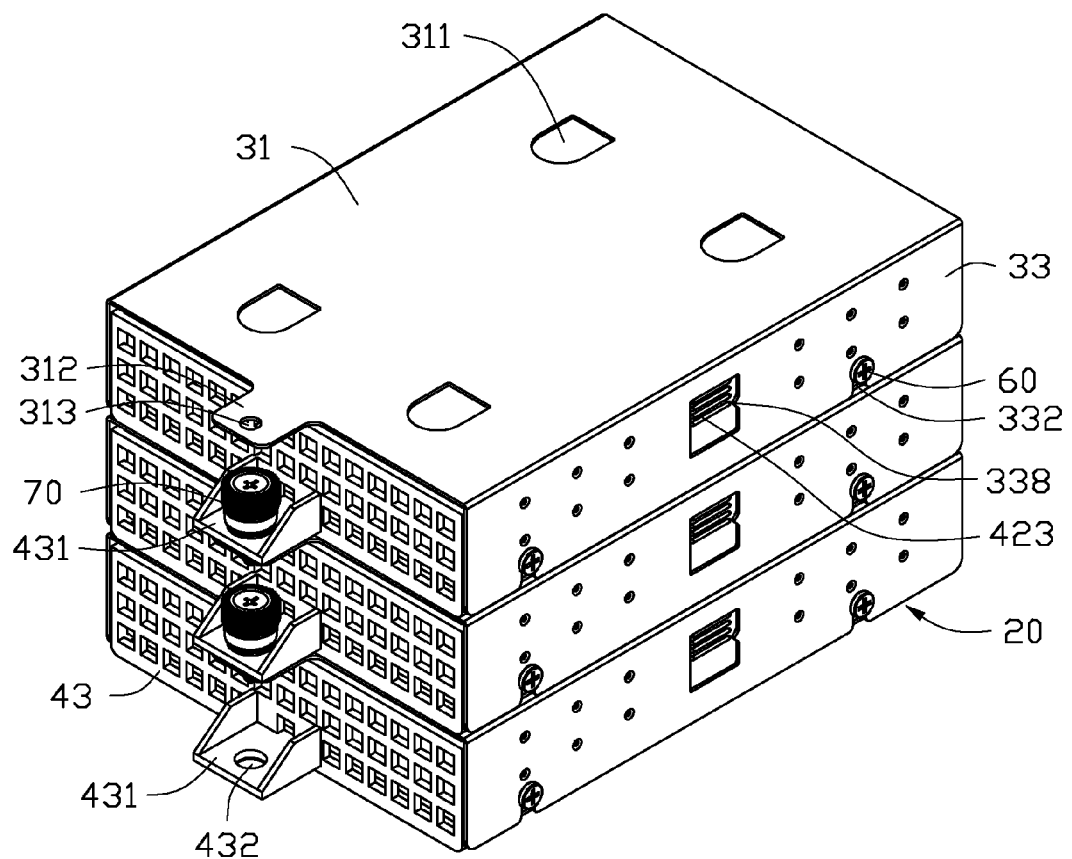
FIG. 1 is an assembled, isometric view of an exemplary embodiment of a hard disk drive (HDD) module, wherein the hard disk drive module comprises a plurality of cartridges and a plurality of HDDs received in the cartridges.
Figure 2:
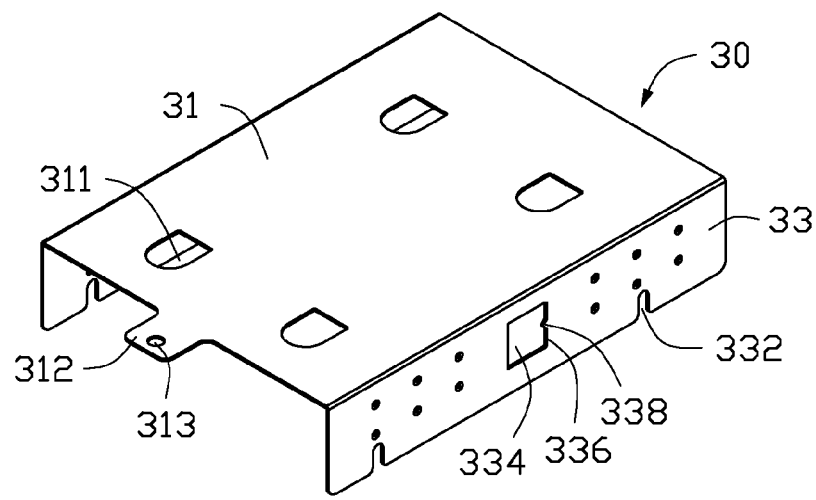
FIG. 2 is an exploded, isometric view of one of the cartridges and the corresponding HDD received in the cartridge of FIG. 1, wherein the cartridge comprises a top cover and a bottom tray.
Figure 2:
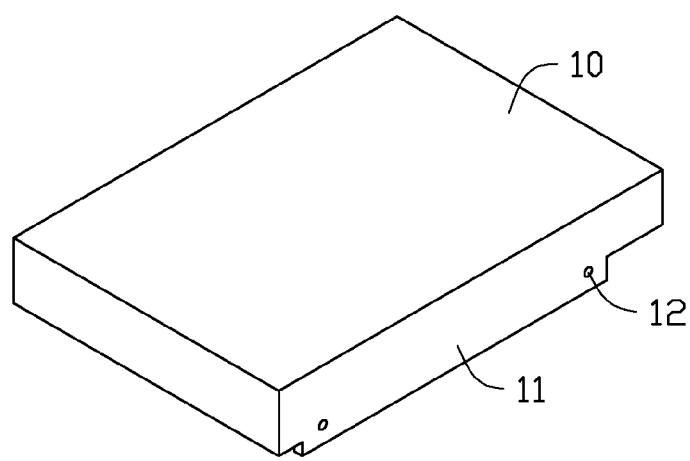
Figure 2:
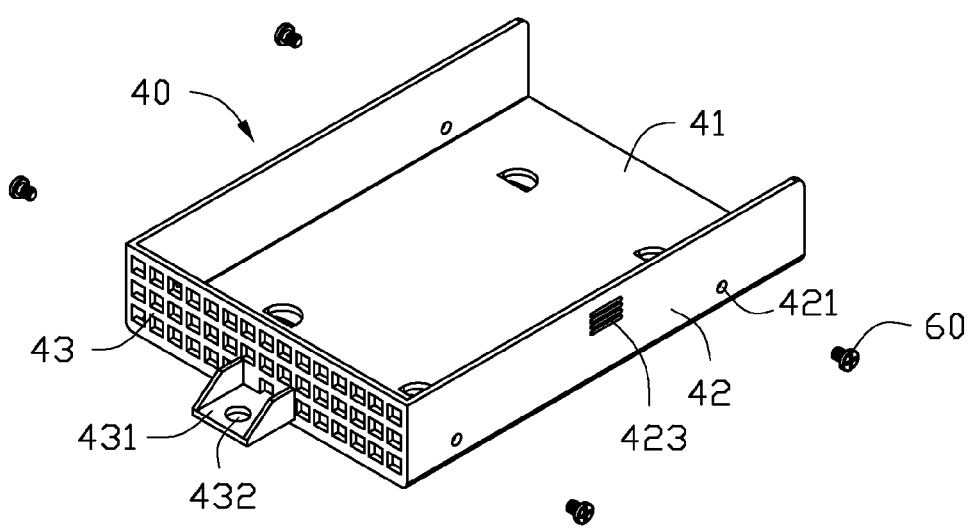

FIGS. 1 and 2 illustrate an exemplary embodiment of a hard disk drive (HDD) module. The HDD module comprises a plurality of HDDs 10 and a plurality of cartridges 20 for receiving the HDDs 10. Each HDD 10 comprises two opposite sidewalls 11. Each sidewall 11 defines two locking holes 12. Each cartridge 20 comprises a top cover 30 and a bottom tray 40.

Figure 3:
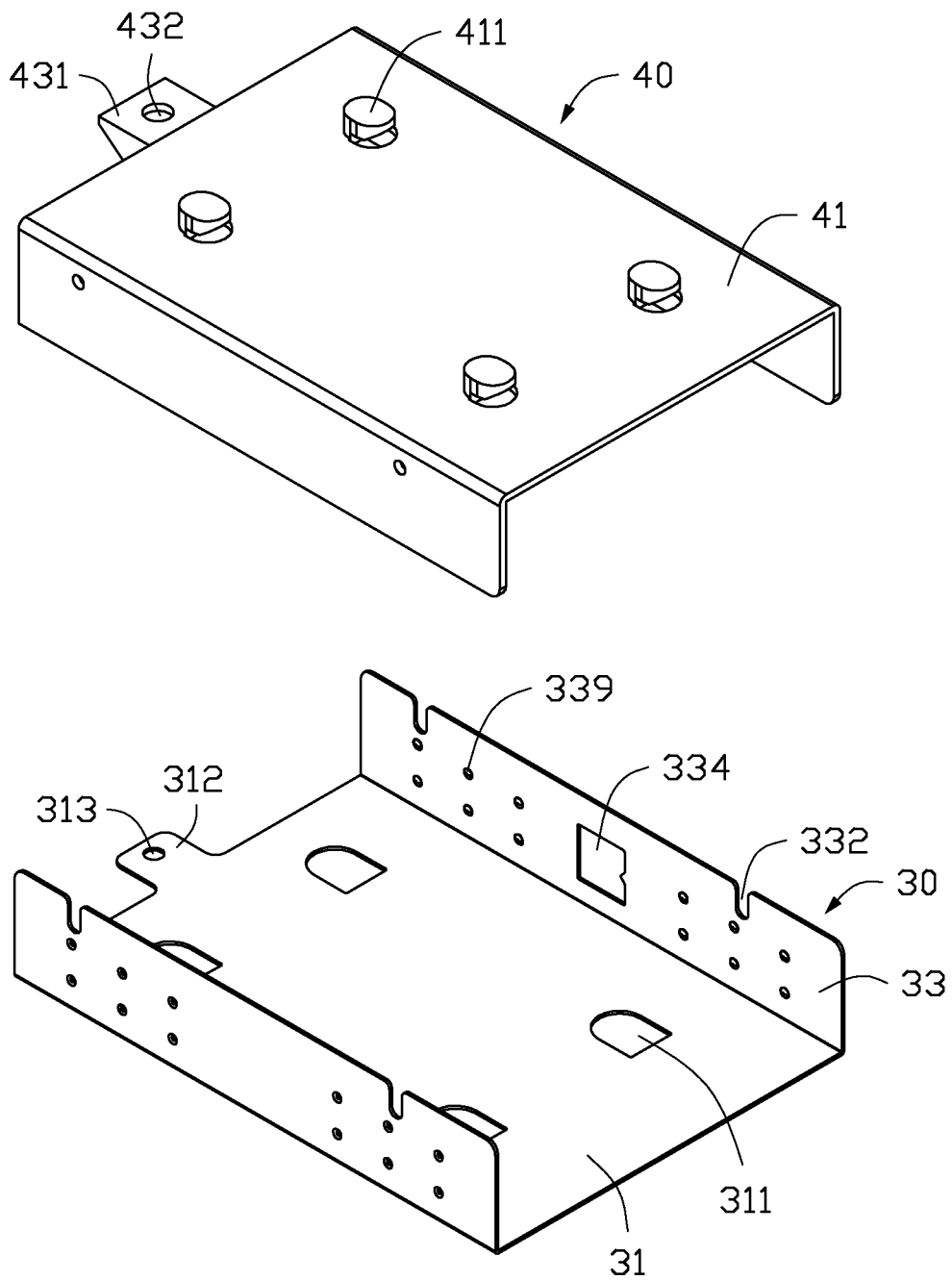
FIG. 3 is an inverted view of the top cover and the bottom tray of FIG. 2.

FIGS. 2 and 3 illustrate each top cover 30 comprising a top plate 31 and two side plates 33 perpendicularly extending down from opposite sides of the top plate 31. The top plate 31 defines four engaging holes 311 arranged in four corners of a rectangle. An extension tab 312 extends from a middle of an end of the top plate 31. The extension tab 312 defines a through hole 313. Each side plate 33 defines two long slide holes 332 extending along a direction perpendicular to the top plate 31. An opening 334 is defined in a middle of one of the side plates 33. The opening 334 comprises a sidewall 336 perpendicular to the top plate 31. A point portion 338 extends from a middle of the sidewall 336. A plurality of protrusions 339 extends from an inner surface of each side plate 33.

Each bottom tray 40 comprises a bottom plate 41, two side plates 42 extending up from opposite sides of the bottom plate 41, and an end plate 43 extending up from an end of the bottom plate 41 and connected to ends of the side plates 42. Four L-shaped hooks 411 extend down from the bottom plate 41. The hooks 411 are arranged in four corners of a rectangle. Each hook 411 extends down from the bottom plate 41 first and extends away from the end plate 43. Each side plate 42 defines two through holes 421. A plurality of scale lines 423 is formed on a middle of one of the side plates 42, and is arranged up and down. In the embodiment, the distance between every two neighboring scale lines 423 is N, wherein N=3 mm. A connection portion 431 extends outward from the end plate 43. The connection portion 431 defines a through hole 432.

Figure 4:
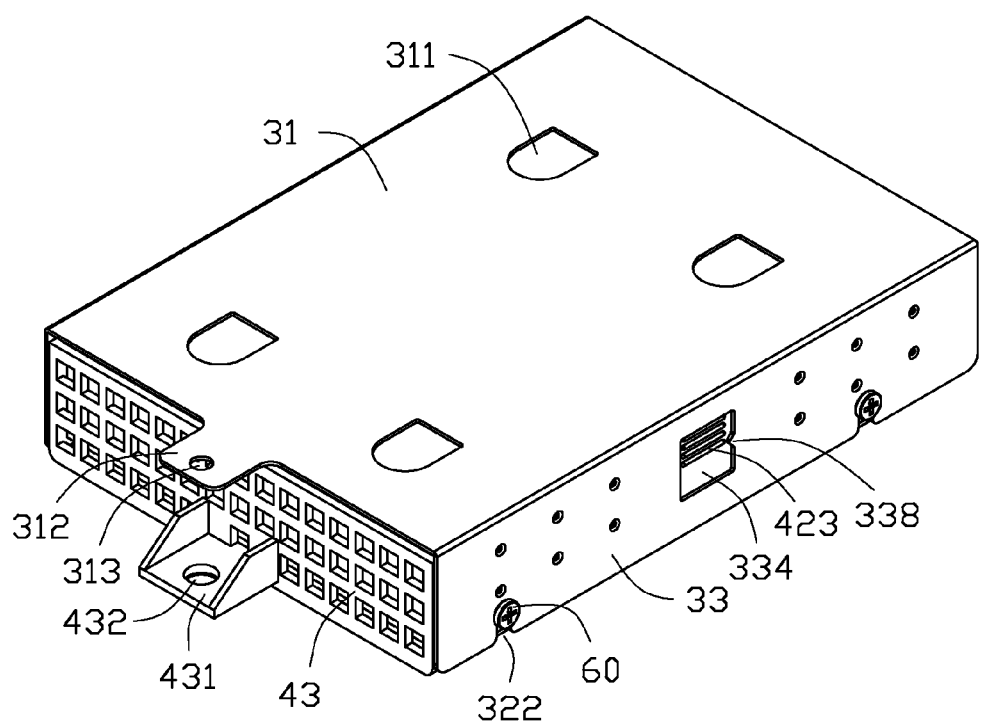
FIG. 4 is an assembled, isometric view of FIG. 2.
Figure 5:
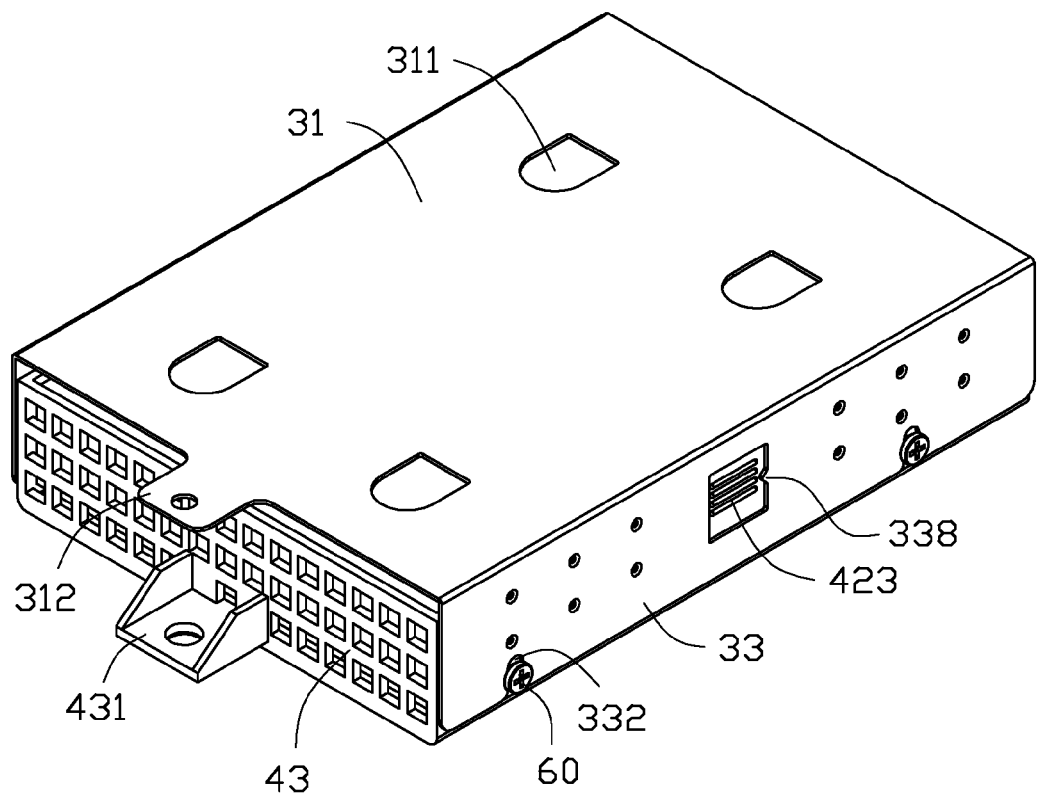
FIG. 5 is similar to FIG. 4, but showing the cartridge in another state.

FIGS. 4 and 5 illustrate that to assemble the top cover 30 and the bottom tray 40 of each cartridge 20, and the corresponding HDD 10, the HDD 10 is placed on the bottom plate 41 of the bottom tray 40. The locking holes 12 of the HDD 10 are aligned with the through holes 421 of the bottom tray 40. The protrusions 339 of the side plates 33 abut against outer surfaces of the side plates 42. The through holes 421 of the bottom tray 40 are aligned with the slide holes 332 of the top cover 30. The opening 334 of the top cover 30 exposes the scale lines 423. When the side plates 33 are adjusted against the side plates 42, the distance between the top plate 31 to the bottom plate 41 varies, that is, the height of the cartridge 20 varies. When top ends of the slide holes 332 align with the through holes 421, the height of the cartridge 20 is a certain minimum value and the point portion 338 points to the bottom scale line 423. When the top plate 31 moves up a distance of N, the point portion 338 accordingly moves up a distance of N and points to an upper neighboring scale line 423. Therefore, according to the scale lines 423 the point portion 338 pointing to, the height of the cartridge 20 is obtained. When the top cover 30 moves up or down, the through holes 421 relatively move along lengthwise directions of the slide holes 332. When the cartridge 20 is adjusted to a required height, four first fasteners 60 extend through the slide holes 332, the through holes 421, and engage in the locking holes 12 of the HDD 10, to finish the assembly of the cartridge 20 and the HDD 10.

FIG. 1 illustrates that the cartridges 20 are arranged upwardly, the bottom tray 40 of each cartridge 20 is fastened to the top plate 31 of the lower and neighboring cartridge 20, detail is given as follows. The connection portion 431 of the bottom tray 40 and the extension tab 312 are both placed forward. The hooks 411 of the bottom tray 40 extend through the engaging holes 311. The bottom tray 40 is supported on the top plate 31. The bottom tray 40 is slid backward, the hooks 411 engage with edges of the engaging holes 311. The through hole 432 of the connection portion 431 aligns with the through hole 313 of the extension tab 312. A second fastener 70 extends through the through hole 432, the through hole 313, and engages in a nut, to fasten the neighboring cartridges 20.

The height of each cartridge 20 can be adjusted, therefore, the height of the HDD module can be adjusted as required.

Even though numerous characteristics and advantages of the embodiments have been set forth in the foregoing description, together with details of the structure and the functions of the embodiments, the disclosure is illustrative only, and changes may be made in details, especially in the matters of shape, size, and arrangement of parts within the principles of the embodiments to the full extent indicated by the broad general meaning of the terms in which the appended claims are expressed.

What is claimed is:

1. A hard disk drive (HDD) module, comprising:
two cartridges for receiving HDDs, each cartridge comprising a bottom tray and a top cover adjustably connected to the bottom tray, each top cover comprising a top plate located above the corresponding bottom tray;
wherein the cartridges are arranged up and down, the bottom tray of the upper cartridge is fastened to the top cover of the lower cartridge.

2. The HDD module of claim 1, wherein each top cover further comprises two side plates extending down from opposite sides of the top plate, each bottom tray comprises a bottom plate and two side plates extending up from opposite sides of the bottom plate, the side plates of the top cover are adjustably connected to the side plates of the bottom tray.

3. The HDD module of claim 2, wherein each side plate of the top cover defines two slide holes, each slide hole extends along a direction perpendicular to the top plate, each side plate of the bottom tray defines two through holes, a plurality of first fasteners extends through the slide holes, the through holes, and engages in the corresponding HDD.

4. The HDD module of claim 2, wherein the side plates of the bottom tray are located between the side plates of the top cover, a plurality of scale lines is formed on one of the side plates of the bottom tray and is arranged up and down, one of the side plates of the top cover defines an opening for exposing the scale lines, a point portion extends from a sidewall of the opening for pointing to the scale lines.

5. The HDD module of claim 4, wherein a plurality of protrusions extends from an inner surface of the one of the side plates of the top cover, to abut against the corresponding side plate of the bottom tray.

6. The HDD module of claim 2, wherein the top plate of the lower cartridge defines a plurality of engaging holes, a plurality of hooks extends down from the bottom plate of the upper cartridge to engage in the engaging holes.

7. The HDD module of claim 6, wherein the bottom tray of the upper cartridge further comprises an end plate connected to ends of the side plates of the bottom tray, a connection portion extends outward from the end plate, an extension tab extends from the top plate of the lower cartridge, the connection portion is fastened to the extension tab by a second fastener.

8. The HDD module of claim 7, wherein the hooks extend down from the bottom plate first and extend away from the end plate.

9. A hard disk drive (HDD) module, comprising:
an HDD; and
a cartridge receiving the HDD, the cartridge comprising a bottom tray and a top cover adjustably connected to the bottom tray, the top cover comprising a top plate located above the bottom tray;
wherein the bottom tray comprises a bottom plate, two side plates extending down from opposite sides of the bottom plate, and a plurality of scale lines formed on one of the side plates of the bottom tray.

10. The HDD module of claim 9, wherein the top cover further comprises two side plates extending down from opposite sides of the top plate, the side plates of the top cover are slidably connected to the side plates of the bottom tray.

11. The HDD module of claim 10, wherein each side plate of the top cover defines two slide holes, each slide hole extends along a direction perpendicular to the top plate, each side plate of the bottom tray defines two through holes, a plurality of fasteners extends through the slide holes, the through holes, and engages in the HDD.

12. The HDD module of claim 10, wherein the side plates of the bottom tray are located between the side plates of the top cover, the plurality of scale lines is arranged up and down, one of the side plates of the top cover defines an opening for exposing the scale lines, and a point portion extends from a sidewall of the opening for pointing to the scale lines.

13. A hard disk drive (HDD) module, comprising:
two or more cartridges, each of said two or more cartridges comprising:
a bottom tray; and
a top cover adjustably connectable to the bottom tray to form a chamber to receive an HDD; and
wherein, the two or more cartridges are arranged vertically with the bottom tray of an upper cartridge connected to the top cover of a lower cartridge.

14. The HDD module of claim 13, wherein
each top cover comprises a top plate with a first edge and a second edge, opposite to and substantially parallel to the first edge; a first top cover side plate substantially perpendicular to the top plate extending from the first top plate edge toward the bottom tray; and a second top cover side plate substantially perpendicular to the top plate extending from the second top plate edge toward the bottom tray; and
each bottom tray comprises a bottom plate with a first edge and a second edge, opposite to and parallel to the first edge; a first bottom tray side plate substantially perpendicular to the bottom plate extending from the first bottom plate edge toward the top cover; and a second bottom tray side plate substantially perpendicular to the bottom plate extending from the second bottom plate edge toward the top cover;
wherein, the top cover side plates are adjustably connectable to the bottom tray side plates.

* * * * *